United States Patent
Zhao et al.

(10) Patent No.: US 9,348,809 B1
(45) Date of Patent: May 24, 2016

(54) MODIFYING A TOKENIZER BASED ON PSEUDO DATA FOR NATURAL LANGUAGE PROCESSING

(71) Applicant: LinkedIn Corporation, Mountain View, CA (US)

(72) Inventors: Bing Zhao, Sunnyvale, CA (US); Ethan Zhang, San Jose, CA (US)

(73) Assignee: LinkedIn Corporation, Mountain View, CA (US)

( * ) Notice: Subject to any disclaimer, the term of this patent is extended or adjusted under 35 U.S.C. 154(b) by 0 days.

(21) Appl. No.: 14/611,816

(22) Filed: Feb. 2, 2015

(51) Int. Cl.
*G06F 17/27* (2006.01)
*G10L 15/183* (2013.01)
*G06F 17/28* (2006.01)

(52) U.S. Cl.
CPC .......... *G06F 17/277* (2013.01); *G06F 17/2863* (2013.01); *G10L 15/183* (2013.01)

(58) Field of Classification Search
CPC ... G06F 17/2818; G06F 17/28; G06F 19/322; G10L 15/26; G06N 99/005
USPC .................. 704/9, 257, 1, E17.094, 10, 246, 704/E15.001, E15.018, 2; 715/243, 255; 707/748, 758, E17.009
See application file for complete search history.

(56) References Cited

U.S. PATENT DOCUMENTS

| 9,110,889 | B2 * | 8/2015 | Bao | G06F 17/271 |
| 2004/0148170 | A1 * | 7/2004 | Acero | G06F 17/2715 704/257 |
| 2010/0241418 | A1 * | 9/2010 | Maeda | G10L 15/1815 704/9 |
| 2014/0195255 | A1 * | 7/2014 | Ghosh | G06Q 50/22 705/2 |

OTHER PUBLICATIONS

Zhang et al., "HHMM-based Chinese Lexical Analyzer ICTCLAS", http://www.aclweb.org/anthology/W/W03/W03-1730.pdf, dated 2003, 4 pages.
Tseng et al., "A Conditional Random Field Word Segmenter for Sighan Bakeoff 2005", dated 2005, http://nlp.stanford.edu/pubs/sighan2005.pdf, 4 pages.
http://projectile.sv.cmu.edu/research/public/tools/segmentation/lrsegmenter/lrSegmenter.perl, last viewed May 21, 2015, 4 pages.

* cited by examiner

*Primary Examiner* — Charlotte M Baker
(74) *Attorney, Agent, or Firm* — Hickman Palermo Becker Bingham LLP; Daniel D. Ledesma

(57) ABSTRACT

Techniques for training a tokenizer (or word segmenter) are provided. In one technique, a tokenizer tokenizes a token string to identify individual tokens or words. A language model is generated based on the identified tokens or words. A vocabulary about an entity, such as a person or company, is identified. The vocabulary may be online data that refers to the entity, such as a news article or a profile page of a member of a social network. Some of the tokens in the vocabulary may be weighted higher than others. The language model accepts the weighted vocabulary as input and generates pseudo sentences. Alternatively, regular expressions are used to generate the pseudo sentences. The pseudo sentences are used to train the tokenizer.

20 Claims, 3 Drawing Sheets

MODIFYING A TOKENIZER BASED ON PSEUDO DATA FOR NATURAL LANGUAGE PROCESSING

FIELD OF THE DISCLOSURE

The present invention relates to word segmentation and, more particularly, to training a word segmenter using automatically-generated sentences.

BACKGROUND

Natural language processing (NLP) is a field of computer science, artificial intelligence, and linguistics concerned with the interactions between computers and human (natural) languages. NLP covers the areas of search, part-of-speech (POS) tagging, machine translation, and speech recognition. One of the fundamental preprocessing steps for each of these areas involves tokenization.

Tokenization is the problem of dividing a string of written language into its component words. In English and many other languages using some form of the Latin alphabet, the space is a good approximation of a token (or word) delimiter. Some examples where the space character alone may not be sufficient include contractions like "can't" for "can not." However, the equivalent to the space character is not found in all written scripts and, without a space character (or something equivalent), tokenization is a difficult problem. Languages which do not have a trivial tokenization process include: (1) Chinese and Japanese where sentences but not words are delimited; (2) Thai and Lao where phrases and sentences but not words are delimited; and (3) Vietnamese where syllables but not words are delimited. Without a tokenizer, an entire Chinese sentence, for example, would be treated as a single word and the corresponding NLP pipeline would be broken.

For languages such as Chinese and Japanese, people have to disambiguate a sentence by understanding the semantics of the sentence first. The following is a Chinese sentence:

我的小孩在桥庄幼 儿园 and its corresponding English translation is "My child is at Qiao Zhuang kindergarten."

The correct segmentation of the above Chinese sentence is as follows:

我 (my) 的 小孩 (child) 在 (is at) 桥庄 (Qiao Zhuang) 幼儿园 (Kindergarten)

The word "桥庄" is a company name. One tokenizer (or "word segmenter" for character-based languages) might segment the Chinese sentence as "桥" and "庄",, which means "bridge" and "village". Such a segmentation will make searching difficult by increasing the search scope to significantly larger index ranges, slowing down the search process, and reducing accuracies. Additionally, such segmentation will also cause a statistical machine translation to generate even worse translations for not only multilingual search, but also any down-stream applications.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Systems and methods are described herein for training a tokenizer to increase its accuracy in identifying proper names, such as people names and company names. A language model is used to automatically generate multiple phrases or sentences based on proper names. Such phrases and sentences include context for the proper names. The generated phrases/sentences are then used to train a tokenizer so that the proper names may be properly recognized and tokenized as part of a NLP process.

While the following description refers to tokenizing characters of character-based languages (such as Chinese), embodiments are not so limited. Embodiments include tokenizing words in non-character-based languages, such as English, French, and German.

Process Overview

Figure 1:
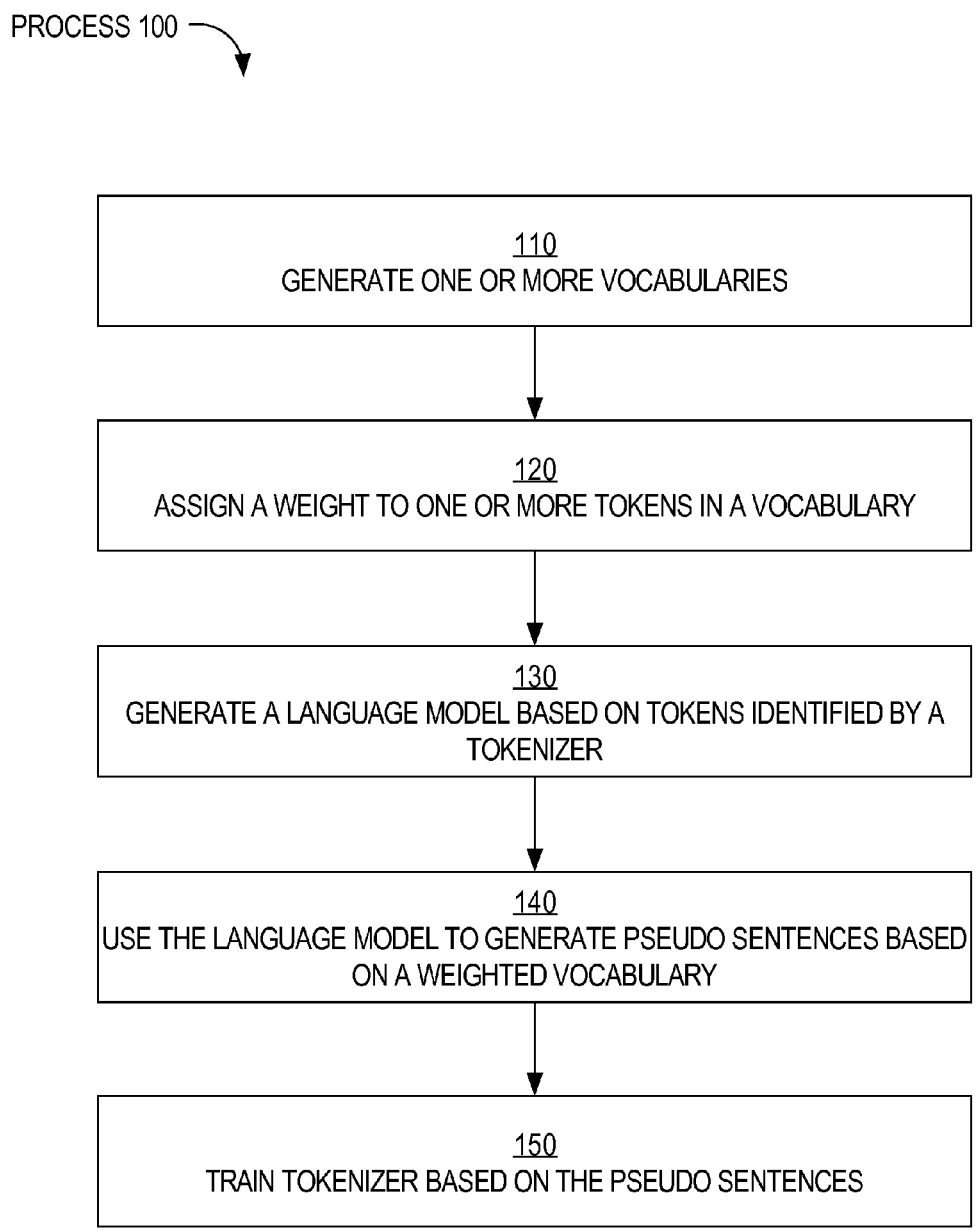
FIG. 1 is a flow diagram that depicts a process for training a tokenizer, in an embodiment.

FIG. 1 is a flow diagram that depicts a process 100 for training a tokenizer, in an embodiment. Process 100 may be implemented in software, hardware, or any combination of hardware and software. Process 100 may be performed on a single computing device or across multiple computing devices. For example, some blocks of process 100 may be performed by a first computing device while other blocks of process 100 may be performed by a second computing device that is communicatively coupled to the first computing device.

At block 110, one or more vocabularies are generated. A vocabulary is a list of words and their associated frequencies. A vocabulary may come from one or more sources, such as profile pages and summaries of members of one or more social networks. Thus, words in the vocabulary may be direct observations of summary data and words frequencies may be derived from the summary data.

Vocabularies may be generated on a per-entity basis, whether the entity is a person or a company. In other words, a different vocabulary may be generated for each person's name and/or for each company name. In this way, the vocabulary for a certain proper name includes a relevant linguistic context for the proper name.

At block 120, a weight is assigned to one or more tokens in a generated vocabulary. A token's weight signifies how important the token is or how often the token should be selected by a language model (described in more detail below). The higher the weight, the more likely the language model will use the token to generate sentences.

At block 130, a language model is generated based on tokens identified by a tokenizer. The language model assigns a probability to a sequence of m words $P(w_1, \ldots, w_m)$ by means of a probability distribution.

At block 140, the language model generates "pseudo" sentences based on the one or more generated vocabularies that are input to the language model. A "pseudo" sentence is an automatically-generated sentence that may or may not be a grammatically complete sentence.

At block 150, the tokenizer is trained based on the generated sentences.

While process 100 is described and depicted as being performed in a particular order, process 100 may be performed in a different order. For example, block 130 may be performed prior to blocks 110 and 120.

System Overview

Figure 2:
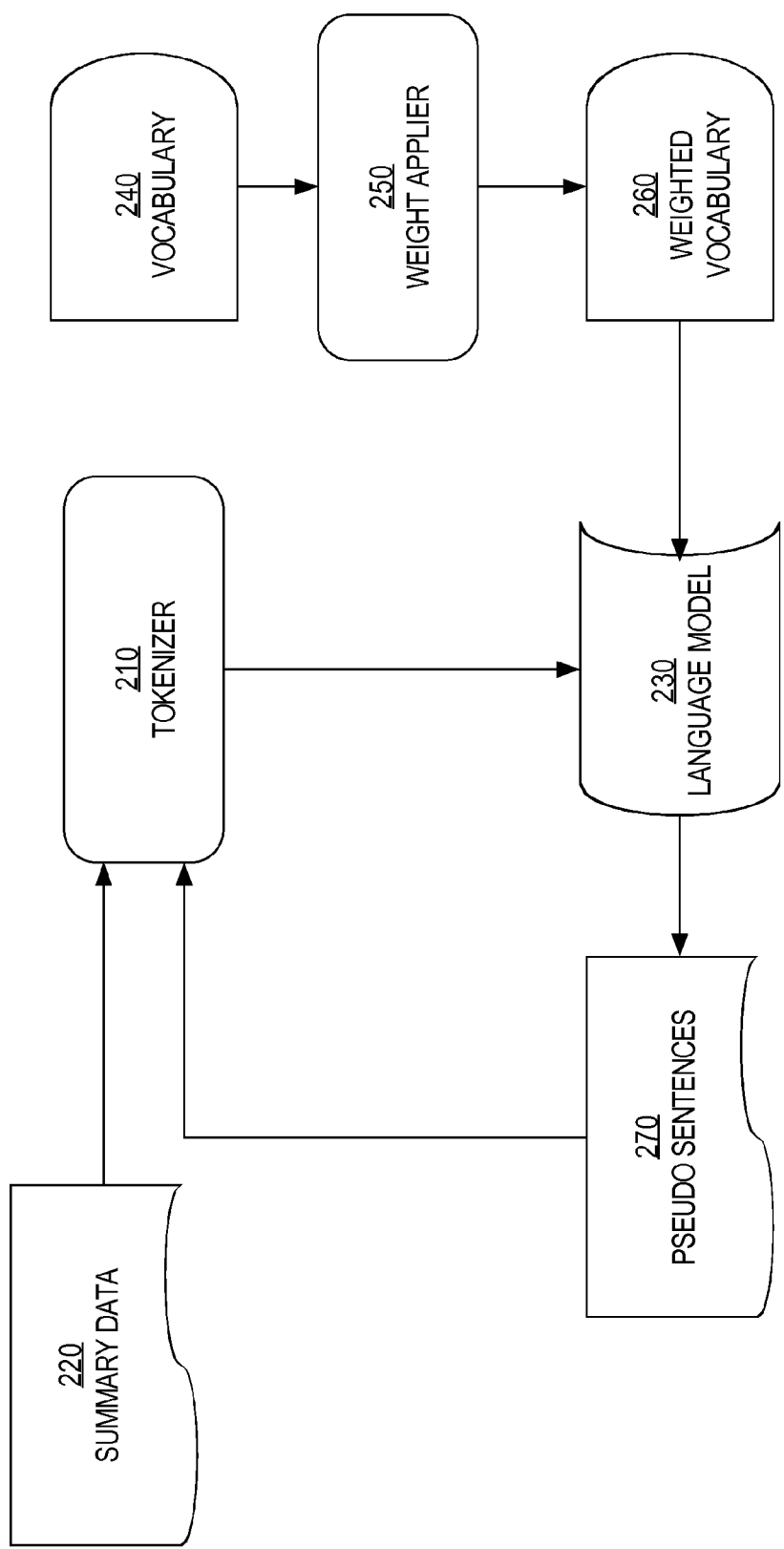
FIG. 2 is a block diagram that depicts a process for training a tokenizer, in an embodiment.

FIG. 2 is a block diagram that depicts a system and a process for training a tokenizer 210, in an embodiment. Tokenizer 210 may be implemented in hardware, software, or a combination of hardware and software. Tokenizer 210 implements one of multiple tokenization techniques, such as a hidden Markov model (HMM) and a conditional random field (CRF). A HMM tokenizer is used to scan a string of characters from left to right and then from right to left to disambiguate tokenization options. A HMM tokenizer may rely on high accuracy dictionaries and pre-tokenized data to train one or more HMM models. A CRF tokenizer also relies on multiple dictionaries and pre-tokenized training data.

Initial training of tokenizer 210 may involve manually segmenting character sentences and, then, labeling characters. The following is a manually-segmented sentence containing nine characters (C1-C9) and where the spaces are used as word boundaries: C1C2 C3C4C5 C6C7C8 C9. Each character in the segmentation is then assigned one of three labels (B, I, S), where 'B' indicates the beginning of A word, 'I' indicates an inside character of a word (i.e., not a beginning character), and 'S' indicates a singleton character (where the character itself is a word). The labeled data for the above manually-segmented sentence is as follows: BIBIIBIIS.

Assigning labels may be performed manually or automatically. Based on the position of each character in a segmented sentence, the appropriate label may be inferred. For example, a character that is itself a word is labeled an 'S', a character that begins a word is labeled a 'B', and a character that is neither a word nor the beginning character in a word is assigned an 'I.'

Feature sets are then constructed, such as in the form of a character N-gram. Using character uni-grams and bi-grams, the feature sets for the above sentence are as follows:

| Character | Label | Features |
|---|---|---|
| C1 | B | C1C2, C1 |
| C2 | I | C1C2, C2, C3, C2 |
| C3 | B | C2C3, C3C4, C3 |
| C4 | I | C3C4, C4C5, C4 |
| C5 | I | C4C5, C5C6, C5 |
| C6 | B | C5C6, C6C7, C6 |
| C7 | I | C6C7, C7C8, C7 |
| C8 | I | C7C8, C8C9, C8 |
| C9 | S | C8C9, C9 |

Labels have constraints in their occurrence in the order. For example, the label 'I' will never occur after 'S', as in 'SI'.

After converting each manually-segmented sentence into the above format, tokenizer 210 can be trained using the feature sets.

After tokenizer 210 has been trained with manually-segmented data, tokenizer 210 receives source data 220 as input.

Examples of source data 220 include profile or summary data provided by users of an online social network (such as LinkedIn, Facebook, and Google), online news articles (e.g., financial, business, sports, and/or politics articles), and an online encyclopedia.

A social network profile of a member may include his/her first name, last name, and/or company name. A social network profile may also include personal hobbies and interests, destinations visited, and residence information. Additionally, a member may input a detailed personal summary. In professional social networks, such a summary may be a detailed summary on the member's previous jobs and/or skills A person's individual summary data is highly relevant to the person. If the party that implements the process of FIG. 2 is a party that owns or manages a social network, then obtaining such summary data is relatively straightforward in order to use in the initial tokenization step.

When source data 220 is input into tokenizer 210, tokenizer 210 may perform a forward-backward search order to infer word segmentation BIS labels for each character, and then the segmented sentence is read off the determined sequential labels. Thereafter, tokenizer 210 is able to generate tokens based on source data 220, each token corresponding to a word (or series of characters) that tokenizer 210 recognizes. For example, one word that tokenizer 210 recognizes may comprise four Chinese characters.

During a tokenization process, tokenizer 210 generates "possible" tokens and "finalized" tokens. A possible token is a token that (1) tokenizer 210 identifies in an input string but (2) is not a finalized token. Tokenizer 210 may identify a possible token because the possible token matches a word in a dictionary. Tokenizer 210 may add one or more words/characters to a possible token or remove one or more words/characters from a possible token.

A "finalized" token, on the other hand, is a token that tokenizer 210 (1) identifies in an input string and (2) will no longer modify. Thus, a finalized token may first be a possible token. Before making a possible token a finalized token, tokenizer 210 may analyze the context of the possible token. The "context" of a possible token refers to one or more characters that precede the possible token in an input string and/or that follow the possible token in the input string. Based on the context of a possible token, tokenizer 210 determines whether to make the possible token a finalized token or to modify the possible token in some way. For example, a possible token may be classified as a beginning word (or word that typically begins a sentence), an intermediate word, an ending word, a verb, or a noun. Based on the classification of a possible token and classifications of tokens that precede the possible token and tokens that follow the possible token, tokenizer 210 determines whether the possible token should be a final token or should be modified in some way.

Based on a set of finalized tokens, a language model 230 is generated. If source data 220 includes summary data of members of an online social network, then language model 230 models a relevant linguistic profile context. Later, as described in more detail below, the linguistic cues that are built into language model 230 may be used to generate phrases or sentences, which can then be used as training data to train (or re-train) tokenizer 210.

In an embodiment, source data 220 is filtered to exclude proper names, such as company names and/or peoples' names. For example, if source data 220 includes summary data of a member of a social network and the summary data includes a company name that is listed in the member's profile, then the company name is identified in the profile and used to remove any instances of the company name from the summary data. Otherwise, if proper names are included in source data 220, then "noisy" data (i.e., incorrect finalized tokens) may be introduced into language model 230. On the other hand, summary data provided by a member of a social network typically does not include the member's name.

Language Model

Language model 230 assigns a probability to a sequence of m words $P(w_1, \ldots, w_m)$ by means of a probability distribution. Having a way to estimate the relative likelihood of different phrases is useful in many natural language processing applications, such as speech recognition, machine translation, part-of-speech tagging, parsing, handwriting recognition, information retrieval, and other applications.

One problem in building language models is data sparsity. Specifically, many possible word sequences will not be observed in building a language model. One solution is to make the assumption that the probability of a word depends on the previous n words. This is known as an n-gram model or a unigram model when n=1, a bigram model when n=2, or a trigram model when n=3.

In an n-gram model, the probability of observing the sentence $w_1, \ldots, w_m$ is denoted as $P(w_1, \ldots, w_m)$ and is approximated as:

$$P(w_1, \ldots, w_m) = \prod_{i=1}^{m} P(w_i \mid w_1, \ldots, w_{i-1}) \approx \prod_{i=1}^{m} P(w_i \mid w_{i-(n-1)}, \ldots, w_{i-1})$$

Here, it is assumed that the probability of observing the $i^{th}$ word ($w_i$) in the context history of the preceding i–1 words can be approximated by the probability of observing $w_i$ in the shortened context history of the preceding n–1 words.

The conditional probability may be calculated from n-gram frequency counts:

$$P(w_i \mid w_{i-(n-1)}, \ldots, w_{i-1}) = \frac{\operatorname{count}(w_{i-(n-1)}, \ldots, w_{i-1}, w_i)}{\operatorname{count}(w_{i-(n-1)}, \ldots, w_{i-1})}$$

For example, in a bigram (n=2) language model, the probability of the sentence "I saw the red house" is approximated as:
 P(I, saw, the, red, house)≈P(I|<s>)P(saw|I)P(the|saw)P(red|the)P(house|red)P(</s>|house)
whereas in a trigram (n=3) language model, the probability of the sentence "I saw the red house" is approximated as:
 P(I, saw, the, red, house)≈P(I|<s>,<s>)P(saw|<s>,I)P(the|I, saw)P(red|saw, the)P(house|the, red)P(</s>|red, house)

The context of the first n–1 n-grams is filled with start-of-sentence markers, denoted <s>. Without an end-of-sentence marker, the probability of an ungrammatical sequence "I saw the" would always be higher than that of the longer sentence "I saw the red house."

In an embodiment, multiple language models are generated. For example, one language model may be generated for people's names while another language model may be generated for company names. In this example, different source data 220 would be used for each language model. In other words, one set of source data for tokenizer 210 would include information about people while another set of source data for tokenizer 210 would include information about companies. In a related embodiment, a different tokenizer is used to tokenize the different set of source data.

In a related embodiment, multiple language models may be generated for people's names and/or multiple language models may be generated for company names. For example, one language model is generated for company executives while another language model is generated for software engineers. As another example, one language model is generated for software companies and another language model is generated for manufacturing companies.

In an embodiment, language model 230 may be based on words or tokens from multiple languages, such as Chinese and English, German and English, or Chinese, Japanese, Korean, English, Spanish, and French. This is useful in scenarios where characters of different languages are found in the same sentence or word corpus. Otherwise, if a tokenizer encounters a token string that includes words and/or characters from multiple languages (referred to as "mixed" encoding), then the tokenizer is more likely to identify tokens in the sentence incorrectly.

Additionally or alternatively, one language model may be generated for one language while another language model may be generated for another language. In this scenario, it may be presumed that there is little (if any) mixed encoding.

Vocabulary Generation

In an embodiment, before or after language model 230 is generated, a vocabulary 240 is generated. Vocabulary 240 is a list of words and their associated frequencies. Vocabulary 240 may come from one or more sources, such as profile pages and summaries of members of one or more social networks. In other words, vocabulary 240 may be a subset of source data 220. Thus, words in vocabulary 240 may be direct observations of summary data and words frequencies may be derived from the summary data.

Vocabulary 240 may be generated on a per-entity basis, whether the entity is a person or a company. In other words, a different vocabulary may be generated for each person's name and/or for each company name. In this way, the vocabulary for a certain proper name includes a relevant linguistic context for the proper name. Thus, vocabulary 240 may include multiple distinct vocabularies, one for each of multiple people and/or one for each of multiple companies.

Sources of vocabulary 240 for a proper name (other than a social user's profile) may be used. For example, an article for a company in an online encyclopedia (e.g., Wikipedia) may be used as a vocabulary for the company. As another example, a search query of a company name is (automatically) provided to a search engine that generates search results that may include text and/or links to web resources (e.g., HTML documents) that include the company name. The web resources may be automatically retrieved and used as a vocabulary for the company name.

As another example, social (e.g., Twitter) messages that are initiated by a particular person and/or mention the particular person may be a source of a vocabulary for the particular person. As another example, social updates from a member of a social network may be used as one source for a vocabulary related to that member. In a related example where summary/profile data is used as a source for a vocabulary, the social updates of a member may be in one or more social networks (e.g., Facebook) that are different than the social network where the summary/profile data originate.

Weight Generation

In an embodiment, weight applier 250 assigns a weight to each of one or more tokens in vocabulary 240. Weight applier 250 may be implemented in software, hardware, or a combination of software and hardware. The weight of a token signifies how important the token is or how often the token should be selected by language model 230. The higher the weight, the more likely language model 230 will use the token to generate sentences.

Weight applier 250 uses one of multiple techniques to apply a weight to a token. One example technique to generate a weight for a token is to determine the token's frequency in a document or document corpus and assign a weight that corresponds to the frequency. Thus, the higher the frequency, the higher the weight.

Another example weighting technique is td-idf or "term frequency-inverse document frequency." Td-idf is a numerical statistic that reflects how important a token is to a document in a collection of documents (or corpus). In the context of the techniques described herein, the document may be a single summary and the corpus may be multiple (e.g., all) summaries. The tf-idf value of a token increases proportionally to the number of times the token appears in a document, but is offset by the frequency of the token in the corpus. The offset helps to control for the fact that some tokens are generally more common than others. For example, while the word "of" may appear numerous times in a document, the word "of" also appears numerous times in multiple documents of a collection that includes the document. Thus, the td-idf of the word "of" is relatively low. Conversely, even though the word "C++" may appear only once or twice in a document, the word "C++" appears only a few times in a document collection that includes the document. Therefore, the td-idf of "C++" is relatively high.

Additionally or alternatively to weighting tokens of vocabulary 240 to generate weighted vocabulary 260, weight applier 250 (or another component) may filter vocabulary 240 (or weighted vocabulary 260) to remove certain tokens. Example words to filter include "stop" words, such as "of", "the", "it", and "on." If weighted vocabulary 260 is filtered, then some relatively highly weighted tokens may be removed.

Weighted vocabulary 260 includes one or more proper names and context that is relevant to the one or more proper names. For example, weighted vocabulary 260 for the company name "LinkedIn" may include highly weighted tokens such as "professional", "social network," "dynamic company," "recruiting source," "dream job," and "employee paradise."

Generating Pseudo Sentences

In an embodiment where language model 230 is generated, language model 230 accepts, as input, weighted vocabulary 260. Language model 230 generates, as output, sentences or phrases, referred to herein as "pseudo sentences." Such phrases/sentences are considered "pseudo" in the sense that a person did not compose the phrases/sentences.

Weighted vocabulary 260 may identify one or more proper names as proper names (e.g., "companyName=Xcalibrator") and context data that includes weighted words that originally co-occurred with the one or more proper names in a sentence. Context data is constrained by vocabulary 240 and is observed from the sentence-level context directly. In this way, language model 230 will generate (or is more likely to generate) one or more pseudo sentences that include the proper name and at least some of the context data.

Additionally, the pseudo sentences are not required to be grammatically correct. Instead, pseudo sentences may only be long enough to present context of sufficient length such that tokenizer 210 (after being trained with the pseudo sentences) is able to make a better decision for a token boundary. For example, pseudo sentences may be restricted to seven tokens long.

Regular Expressions

In alternative embodiment, instead of generating language model 230 (whether one or multiple), pseudo sentences are generated based on a set of regular expressions. The type of proper name may dictate which regular expression to use. For example, if a proper name is a person's name, then a regular expression may be "X point out that . . . " where X represents a person's name, either first name, last name, or both. Other example regular expressions are as follows: (1) "X graduated from CMU, and joined a startup Uber afterwards"; (2) "X won the best paper award in ACL-2014; (3) "IBM awarded X the teaching fellowship"; (4) "X is a Amazon professor in University of Washington"; (5) "The New York Times cited X's comment on the issue"; (6) "X and Tina have two children"; (7) "X, the Intel architect, said that . . . "

Examples of regular expressions for generating pseudo sentences for company names include "Y is a great company," "I worked for Y," "Y has many employees," and "Y's stock has fell/risen . . . " where Y represents a company's name.

A regular expression may be composed manually or automatically. For example, a regular expression may be automatically "learned" based on labeled training data. Given the labeled data, the entity name may be automatically substituted with a variable (e.g., "X") and each sentence or phrase with a variable "X" can be a new regular expression.

Additionally, a different regular expression may be generated based on the type of entity. An entity's type may be dictated by geography, language, profession, business area, product/service provided, or personal interest. For example, one set of regular expressions may be used to generate pseudo sentences for software companies while another set of regular expressions may be used to generate pseudo sentences for financial companies. As another example, one set of regular expressions may be used to generate pseudo sentences for legal professionals while another set of regular expressions may be used for company executives.

In an embodiment, before training tokenizer 210 using pseudo sentences, a subset of the pseudo sentences are modified or filtered. A goal is that the generated pseudo sentences be centered on weak decision boundaries of a tokenizer. There are potentially many low-frequent character ngrams near those decision boundaries. Thus, it is important that the pseudo sentences contain many of the low-frequent character ngrams. One approach is to filter out pseudo sentences that are greater than a particular length. Another approach is to filter out pseudo sentences that contain only very high frequent words or filler words. Such sentences do not bring in new information to tokenizer 210 to yield better data points. Instead, such sentences may only add "noise" to tokenizer 210.

Training the Tokenizer

Pseudo sentences (whether generated by language model 230 or using regular expressions) are used to train tokenizer 210. In an embodiment, training tokenizer 210 involves adding proper names to one or more dictionaries that tokenizer 210 uses to tokenize a string. Peoples' names and companies names that are labeled as such in a social network are almost guaranteed to be spelled correctly. Thus, if the entity that controls tokenizer 210 also has access to profile data of members of a large social network, then the entity may have a significant set of tokens from which to train tokenizer 210.

Adding a proper name to a dictionary may involve inserting, in the dictionary, the proper name and type data that indicates whether the proper name is a person's first name, last name, or whether the proper name is a company name. Thus, when tokenizer 210 is later tokenizing a string and identifies a possible token that matches the proper name in the string, tokenizer 210 may use the type data (associated with proper name in the dictionary) and, optionally, the context of the possible token to determine whether the possible token should be a finalized token.

Additionally or alternatively to adding proper names to a dictionary, training tokenizer 210 may involve one of multiple techniques. Because generated pseudo sentences are automatically segmented, no manual segmentation is necessary (as in the initial training scenario). Additionally, the pseudo sentences may be automatically labeled using, for example, BIS labels, as described previously.

In an embodiment, after tokenizer 210 is trained, tokenizer 210 is used to identify tokens in a token string, which tokens are used to generate another (and more accurate) language model (not depicted in FIG. 1). The token string may be source data 220 (or a portion thereof), which was used previously as input to tokenizer 210.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
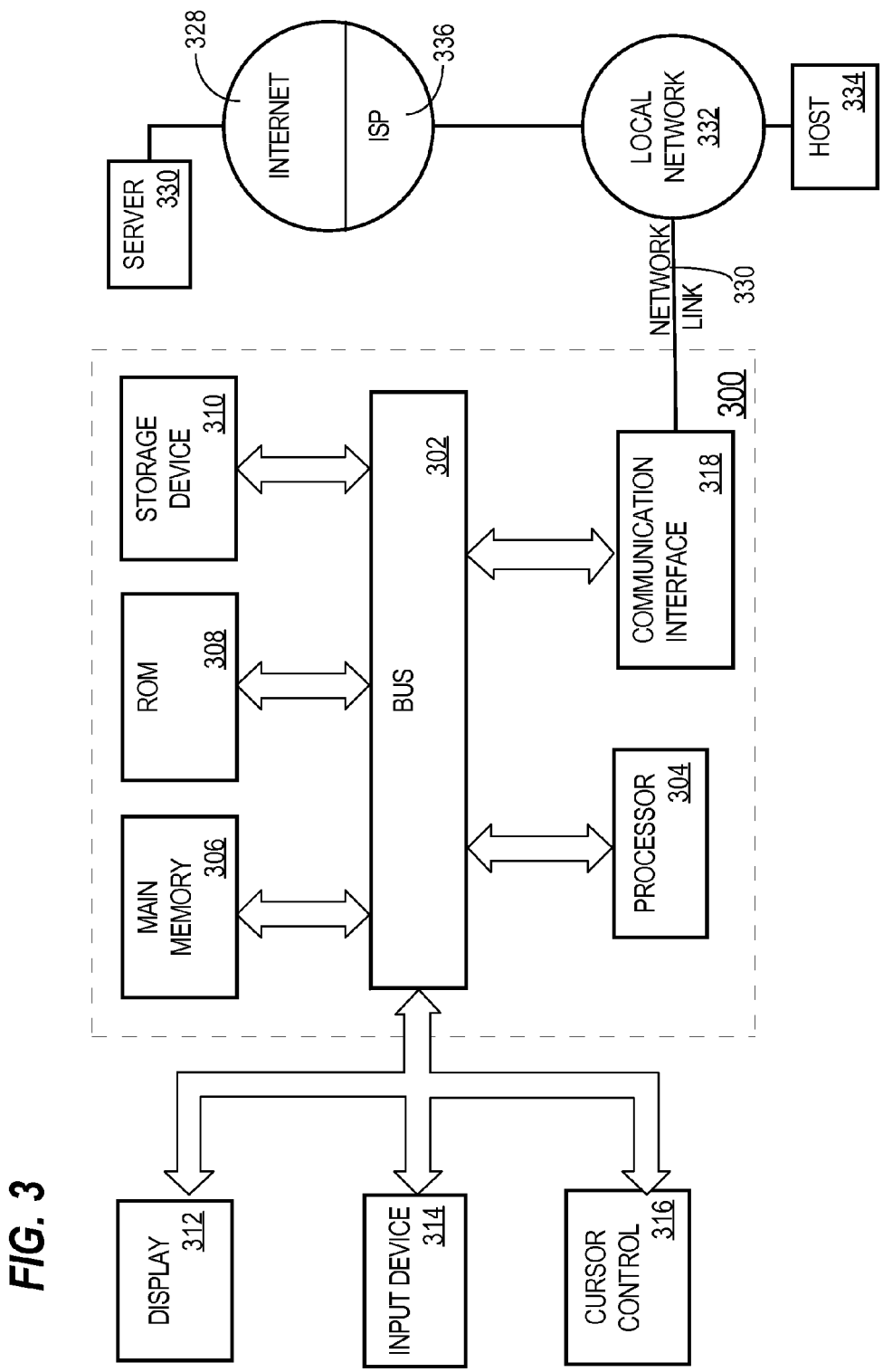
FIG. 3 is a block diagram that illustrates a computer system upon which an embodiment of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying, from a plurality of profiles of entities of a social network, a plurality of proper names of the entities;
   automatically generating, based on the plurality of proper names, using one or more language models, a plurality of sentences;
   based on the plurality of sentences, training a tokenizer that is configured to identify tokens within a token string;
   wherein the method is performed by one or more computing devices.

2. The method of claim 1, wherein:
   the one or more language models includes a first language model and a second language model that is different than the first language model;
   automatically generating the plurality of sentences comprises:
      using the first language model to generate a first set of one or more sentences;
      using the second language model to generate a second set of one or more sentences;
   wherein the plurality of sentences includes the first set of one or more sentences and the second set of one or more sentences.

3. The method of claim 1, wherein a language model of the one or more language models is a first language model, further comprising:
   after training the tokenizer, using the tokenizer to generate a second language model that is different than the first language model.

4. The method of claim 2, wherein the first language model is based on first data about a first entity and the second language model is based on second data about a second entity that is different than the first entity.

5. The method of claim 4, further comprising, prior to training the tokenizer:
   using the tokenizer to tokenize (1) first data to generate a first plurality of tokens and (2) second data to generate a second plurality of tokens;
   generating the first language model based on the first plurality of tokens;
   generating the second language model based on the second plurality of tokens.

6. The method of claim 5, further comprising:
   identifying, from the plurality of profiles, summary data that the entities composed;
   wherein the first data is a first portion of the summary data and the second data is a second portion of the summary data.

7. The method of claim 1, further comprising, prior to generating the plurality of sentences:
   analyzing a social profile of a user in the social network, wherein analyzing comprises determining a list of words or characters in the social profile and determining a frequency of each word or character in the list;
   generating a vocabulary based on the list and the frequency.

8. The method of claim 7, further comprising:
   for each word or character of multiple words or characters in the vocabulary, applying a weight to said each word or character.

9. The method of claim 8, wherein generating the plurality of sentences comprises generating the plurality of sentences based on the weight for each of the multiple words or characters.

10. The method of claim 1, wherein the plurality of proper names include names of companies or names of people.

11. A system comprising:
   one or more processors;
   one or more non-transitory storage media storing instructions which, when executed by the one or more processors, cause:
      identifying, from a plurality of profiles of entities of a social network, a plurality of proper names of the entities;
      automatically generating, based on the plurality of proper names, using one or more language models, a plurality of sentences;
      based on the plurality of sentences, training a tokenizer that is configured to identify tokens within a token string.

12. The system of claim 11, wherein:
the one or more language models includes a first language model and a second language model that is different than the first language model;
automatically generating the plurality of sentences comprises:
using the first language model to generate a first set of one or more sentences;
using the second language model to generate a second set of one or more sentences;
the plurality of sentences includes the first set of one or more sentences and the second set of one or more sentences.

13. The system of claim 11, wherein a language model of the one or more language models is a first language model, wherein the instructions, when executed by the one or more processors, further cause:
after training the tokenizer, using the tokenizer to generate a second language model that is different than the first language model.

14. The system of claim 12, wherein the first language model is based on first data about a first entity and the second language model is based on second data about a second entity that is different than the first entity.

15. The system of claim 14, wherein the instructions, when executed by the one or more processors, further cause, prior to training the tokenizer:
using the tokenizer to tokenize (1) first data to generate a first plurality of tokens and (2) second data to generate a second plurality of tokens;
generating the first language model based on the first plurality of tokens;
generating the second language model based on the second plurality of tokens.

16. The system of claim 15, further comprising:
identifying, from the plurality of profiles, summary data that the entities composed;
wherein the first data is a first portion of the summary data and the second data is a second portion of the summary data.

17. The system of claim 11, wherein the instructions, when executed by the one or more processors, further cause, prior to generating the plurality of sentences:
analyzing a social profile of a user in the social network, wherein analyzing comprises determining a list of words or characters in the social profile and determining a frequency of each word or character in the list;
generating a vocabulary based on the list and the frequency.

18. The system of claim 17, wherein the instructions, when executed by the one or more processors, further cause:
for each word or character of multiple words or characters in the vocabulary, applying a weight to said each word or character.

19. The system of claim 18, wherein generating the plurality of sentences comprises generating the plurality of sentences based on the weight for each of the multiple words or characters.

20. The system of claim 11, wherein the plurality of proper names include names of companies or names of people.

* * * * *